Nov. 22, 1938.     R. R. SEARLES     2,137,546
SEAL
Filed Nov. 5, 1936
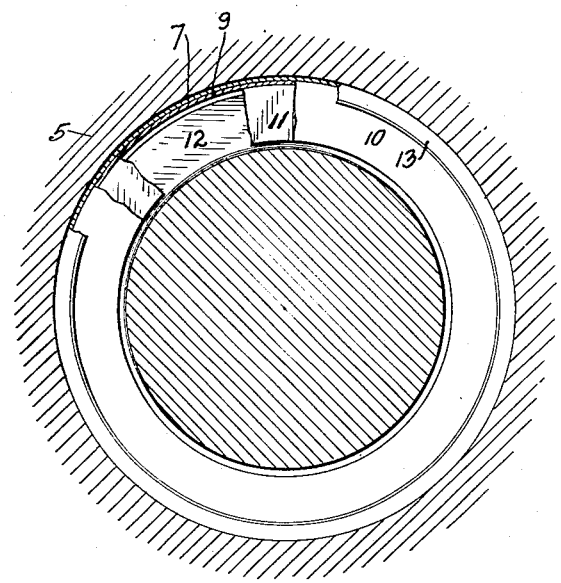
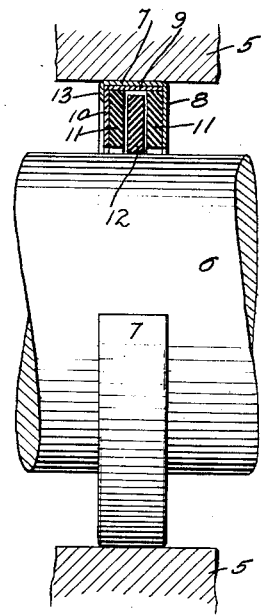
INVENTOR
RAYMOND R. SEARLES
BY
ATTORNEYS Patented Nov. 22, 1938

2,137,546

UNITED STATES PATENT OFFICE 2,137,546

SEAL

Raymond R. Searles, New Britain, Conn., assignor to The Fafnir Bearing Company, New Britain, Conn., a corporation of Connecticut Application November 5, 1936, Serial No. 109,210

1 Claim. (Cl. 288—1)

My invention relates to a seal which may be employed between relatively rotating parts, such as the rings of an anti-friction bearing or a housing and shaft rotatable therein.

It is the principal object of my invention to provide a unitary labyrinth type of seal, which may be handled and applied as a unit.

It is another object to provide an improved form of unit handling seal.

Other objects and features of invention will be hereinafter pointed out or will become apparent to those skilled in the art.

In the drawing which shows, for illustrative purposes only, a preferred form of the invention:

Fig. 1 is an axial view of a seal interposed between a housing and a shaft rotatable therein, parts being broken away for illustration; and Fig. 2 is an edge view in quarter section of the seal shown in Fig. 1 and applied between the housing and shaft.

In the drawing 5 indicates generally a support through which an inner rotating member, such as a shaft 6, extends and which it is desired to seal at the point where it passes through the housing. My improved seal is of unit handling, labyrinth type and includes spaced apart seal plates to be permanently carried by one of the parts, such as the housing, and another seal plate interposed between the spaced apart seal plates and unitarily carried with those plates but adapted to be forced over a shaft and to rotate therewith, if the seal is such that the fixed plates are carried by the housing.

My improved construction may include a cup-shaped sheet metal member 7 of a diameter to frictionally fit the bore of the housing 5. The bottom of the cup has an opening for the passage of the shaft, so that in effect the cup comprises the side or sleeve 7 and an inwardly directed flange 8 extending in the direction of and preferably in proximity to the shaft 6. A second cup of slightly smaller diameter, including the side or sleeve 9, fits within the first cup and the bottom of the second cup is apertured for the reception of the shaft 6, the same as the first cup, so that the second cup, interfitting with the first cup, includes the side 9 and an inwardly directed flange 10.

While the flanges 8—10 may be considered seal plates I prefer to additionally employ non-metallic seal plates, preferably of fiber, leather, synthetic rubber or the like, in the form of annular plates or washers 11—11, abutting the side plates 8—10 and permanently carried by the inwardly opening, channel-shaped annulus formed by the two interfitting cups. Interposed between the side seal plates is another seal plate 12 in the form of an annulus or washer, preferably formed of non-metallic material, such as fiber, leather, synthetic rubber or the like, and of an internal diameter to quite tightly fit the shaft 6 or other rotating part, such diameter being less than the internal diameter of the annuli 11—11. The outer diameter of the seal plate 12 is slightly less than the internal diameter of the channel and the thickness of the seal plate 12 is less than the distance between the side plates 11—11, so that the plate 12 may be free of both side plates as well as the bottom of the channel.

When the parts have been assembled they may be held in permanently assembled relation by flanging or crimping over the free end of the side of the cup 7, as indicated at 13, so as to permanently secure all of the seal plates in assembled relation. The seal plate 12 is of such diameter that it cannot escape from the space within the channel and between the seal plates 11—11, so that the entire seal is of unitary construction and may be handled and applied as a unit.

To apply the seal the latter is slipped over the shaft and the seal plate 12 may be slid along the shaft by simply forcing the sheet metal channel along and into the bore of the housing 5, where it may be held friction tight or be otherwise secured in place.

It will be noted that when the seal plate 12 is slid along over the shaft to its permanent position thereon it will contact with one or the other of the side plates 11—11. If the construction is such that after the plate 12 is in place either the shaft or the housing may be moved endwise relatively to each other a slight distance so as to position the seal plate 12 about centrally between the sides plates 11—11, the construction will perhaps function best. However, if the construction is such that there cannot be that relative movement after assembling, then the seal plate 12 might for a time remain in contact with the side plate 11 which was effective in sliding the plate 12 onto the shaft. During operation the seal plate 12 will either work its way free of the contacting side plate or sufficient wear will occur to substantially free those parts from contact with each other. Furthermore, since the seal plates or one of them is of non-metallic yielding material there will be no objectionable metallic noises, even if the plates should contact each other during relative rotation thereof. The seal itself is of labyrinth type and will effectively seal lubricant within the housing and prevent the ingress of foreign matter thereto. The seal may be sold or stocked as a unit. There are no parts to get lost or be omitted during assembly with the parts to be sealed.

While the invention has been described in considerable detail it is to be understood that various changes may be made within the scope of the invention as defined in the appended claim.

I claim:

As an article of manufacture, a unitary labyrinth type of seal, including a sheet metal annulus channel-shaped in cross section opening radially inwardly, a pair of spaced apart nonmetallic seal plates in said channel at and abutting flatwise against the sides thereof and spaced apart centrally, said seal plates being securely held in said channel in spaced apart relation, and another seal plate within said channel having an opening to fit on a shaft member and rotate therewith and of an external diameter slightly less than the internal diameter of the bottom of said channel and slightly thinner than the distance between the adjacent inner sides of said first mentioned seal plates.

RAYMOND R. SEARLES.